United States Patent
Beck et al.

[11] Patent Number: 5,945,009
[45] Date of Patent: Aug. 31, 1999

[54] APPARATUS FOR PROCESSING WORKPIECES BY SPARK EROSION

[75] Inventors: Ernst Beck, Maselheim; Norbert Bailer, Schemmerhofen; Peter Lenard, Biberach, all of Germany

[73] Assignee: Vollmer Werke Maschinenfabrik GmbH, Riss, Germany

[21] Appl. No.: 08/945,620

[22] PCT Filed: May 10, 1996

[86] PCT No.: PCT/EP96/02018

§ 371 Date: Oct. 28, 1997

§ 102(e) Date: Oct. 28, 1997

[87] PCT Pub. No.: WO96/35544

PCT Pub. Date: Nov. 14, 1996

[30] Foreign Application Priority Data

May 12, 1995 [DE] Germany ............ 195 17 548

[51] Int. Cl.⁶ .................................................. B23H 1/00
[52] U.S. Cl. ................................ 219/69.11; 483/14
[58] Field of Search ................ 219/69.11, 69.15; 483/14

[56] References Cited

U.S. PATENT DOCUMENTS

| | | | |
|---|---|---|---|
| 4,646,422 | 3/1987 | McMurtry | 483/14 |
| 4,736,512 | 4/1988 | Gusching et al. | 483/14 |
| 5,045,664 | 9/1991 | Nakagawa et al. | 219/69.21 |
| 5,309,368 | 5/1994 | Chern | 483/14 |
| 5,506,380 | 4/1996 | Lodetti | 219/69.11 |
| 5,530,217 | 6/1996 | Knecht | 219/69.11 |

FOREIGN PATENT DOCUMENTS

| | | |
|---|---|---|
| 28 37 719 C2 | 11/1982 | Germany . |
| 38 26 251 A1 | 2/1989 | Germany . |
| 43 20 530 C1 | 9/1994 | Germany . |
| 43 30 885 C1 | 2/1995 | Germany . |
| 0 132 599 A1 | 2/1985 | WIPO . |

*Primary Examiner*—Geoffrey S. Evans
*Attorney, Agent, or Firm*—Clifford W. Browning; Woodard, Emhardt, Naughton, Moriarty & McNett

[57] ABSTRACT

A means for spark erosion of workpieces. A workpiece carrier (20) and a carriage (30) including a tool support (32) are movable in controlled fashion with respect to each other along the three axes of a three dimensional coordinate system (X, Y, Z) in the work space (46) of an erosion machine (10). One of the axes (Y) of movement of the carriage (30) is parallel to the axis (A) of the workpiece carrier (20). Workpiece holds (60) of a magazine (50) are movable into the work space (46), one of them each being positioned with its axis parallel to said axis (Y) of the carriage (30) in a transfer position (P). A gripper (40) is disposed on the carriage (30), spaced from the tool support (32), for exchanging workpieces (W) between the magazine (50) and the workpiece carrier (20).

11 Claims, 11 Drawing Sheets

APPARATUS FOR PROCESSING WORKPIECES BY SPARK EROSION

The instant invention relates to a means for processing workpieces by spark erosion, comprising an erosion machine with a work space in which a workpiece carrier and a carriage including a tool support are movable in controlled fashion with respect to each other along at least the three axes of a three dimensional coordinate system, one of the axes of movement of the carriage being parallel to the axis of the workpiece carrier, a magazine comprising workpiece holds which are movable into the work space and at least one of which, located in a transfer position, is arranged with its axis parallel to said one axis of the carriage movement, and a gripper for exchanging workpieces between the magazine and the workpiece carrier.

In the case of a known means of this kind (DE 43 30 885 C1) the magazine comprises two turntables disposed coaxially above each other. The lower one accommodates a plurality of pallets each containing one workpiece, while electrodes are mounted on the upper one which additionally provides space for a transport gripper in a position of rest. The tool support carries a chuck for selectively clamping an electrode or the transport gripper. When a finished workpiece is to be replaced by one that is to be worked on, the carriage with the workpiece carrier is moved from the machining position into a transfer position in which the chuck of the tool support is located above a free spot on the upper turntable. Thereupon the chuck is opened, and the electrode held by it is deposited on the upper turntable. Subsequently, the upper turntable is moved on so that the transport gripper resting on it will get into the transfer position. By its chuck, the tool support now grasps the transport gripper, and then the carriage together with the tool support and the transport gripper move back into the machining position where the transport gripper picks up the finished workpiece. Following that, the carriage returns to the magazine where the transport gripper releases the finished workpiece in a free spot on the lower turntable. Subsequently, the lower turntable is moved on so as supply an unprocessed workpiece to the transport gripper to be gripped by it. Renewed movement of the carriage brings the unprocessed workpiece into the machining position where it is deposited on the workpiece carrier and then clamped. Together with the chuck and the transport gripper, the carriage then travels to the magazine once more where the chuck releases the transport gripper and instead takes hold of an electrode. Finally, the carriage, including the tool support and the electrode clamped by its chuck, again return to the machining position. Only then can the machining begin of the workpiece which is waiting for it.

It is the object of the invention to improve a means for spark erosion of workpieces in such a way that workpiece handling during the exchange thereof will be facilitated.

Starting from a means of the kind specified initially, this object is met, in accordance with the invention, by having the gripper disposed permanently on the carriage, spaced from the tool support. In this manner, once a workpiece has been finished, the gripper always is ready to release the finished workpiece in the magazine and to convey a new workpiece for machining from the magazine to the workpiece carrier. Thereupon the tool support may be set to work immediately to process the workpiece.

According to a preferred embodiment of the invention the carriage is movable along two axes, and the workpiece carrier is movable along the third axis of the three dimensional coordinate system. This division of movements additionally contributes to reducing the idle periods involved in the conveyance of workpieces.

In the context of the instant invention, the term workpiece is to be understood in the first place as referring to workpieces which include cutter blades or inserts of polycrystalline diamonds (PKD) or of hard metals, such as milling cutters, drill bits, saw blades, and the like. The expression tool of an erosion machine is to be understood as being an electrode which may be embodied, for example, by an electrode wire or a rotating electrode disc, as is well known.

BRIEF DESCRIPTION OF THE DRAWINGS

The invention will be described further, by way of example, with reference to the accompanying drawings, in which.

DETAILED DESCRIPTION OF THE INVENTION

Figure 1:
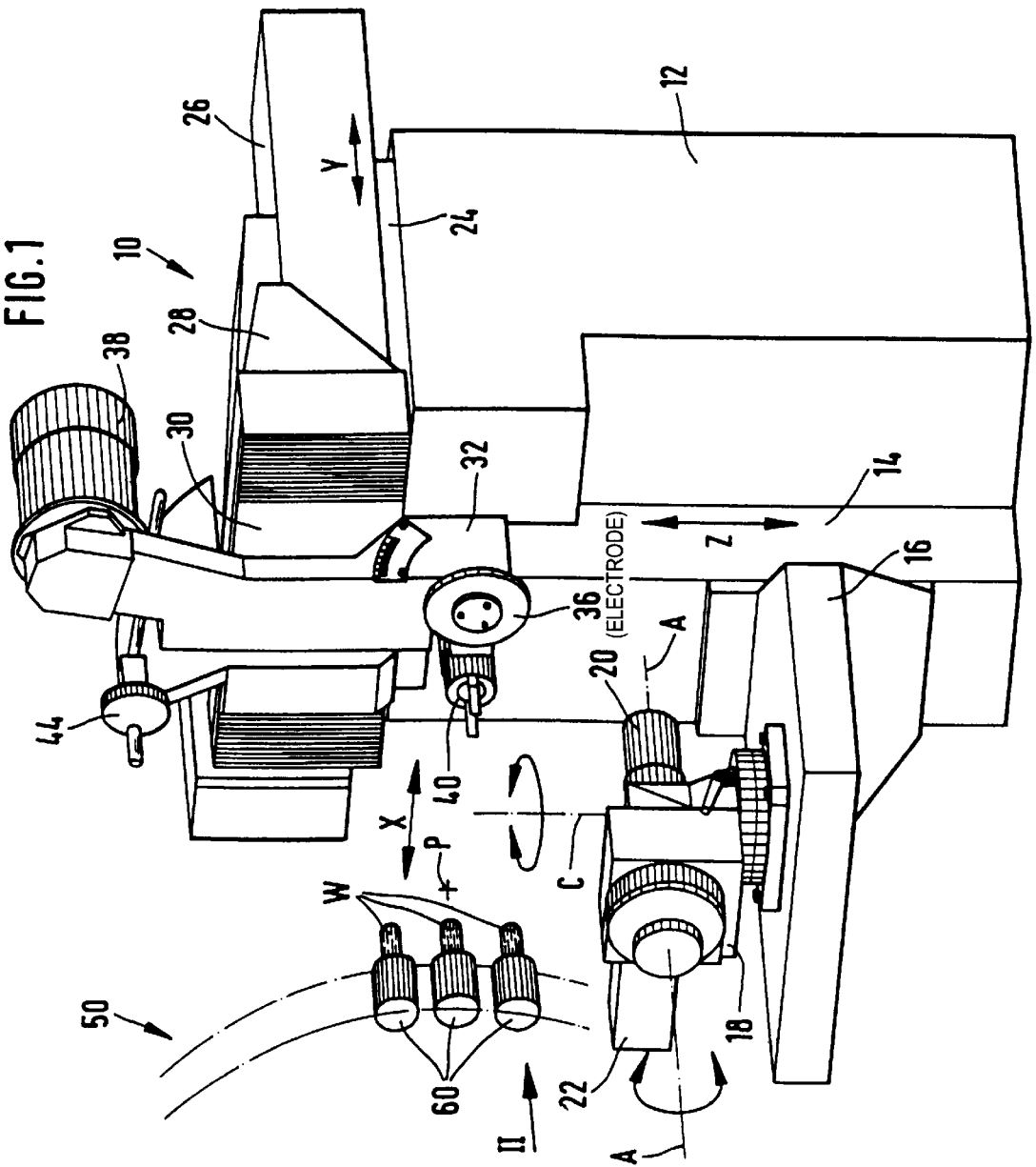
FIG. 1 is an oblique view of a means according to the invention.

The apparatus illustrated in FIG. 1 comprises an erosion machine 10 including a machine bed 12 along which a Z carriage 16 is movable under numerical control along a vertical Z guide member 14. On top of the Z carriage 16 a block 18 is provided which is adapted to be adjusted by rotation about a vertical axis C and then fixed and on which a workpiece carrier 20 is mounted. The latter is designed like any known chuck and adapted to be driven in rotation about a horizontal axis A by a numerically controlled drive means 22.

The machine bed 12, moreover, is formed with a horizontal Y guide member 24 along which a Y carriage 26 is movable under numerical control. With the adjustment of the block 18 as illustrated, the axis A of the workpiece carrier 20 extends parallel to the Y guide member 24. The Y carriage 26 is formed with an X guide member 28 perpendicular to the Z guide member 14 and to the Y guide member 24 and, therefore, likewise extending horizontally. An X carriage 30 is movable under numerical control along the X guide member 28. A tool support 32 which supports an erosion spindle 34 is adjustably mounted on the X carriage 30. An exchangeable electrode disc 36 is mounted on the end of the erosion spindle 34 facing the observer of FIGS. 1 and 2. A motor 38 is attached to the tool support 32 to drive the erosion spindle 34.

Figure 2:
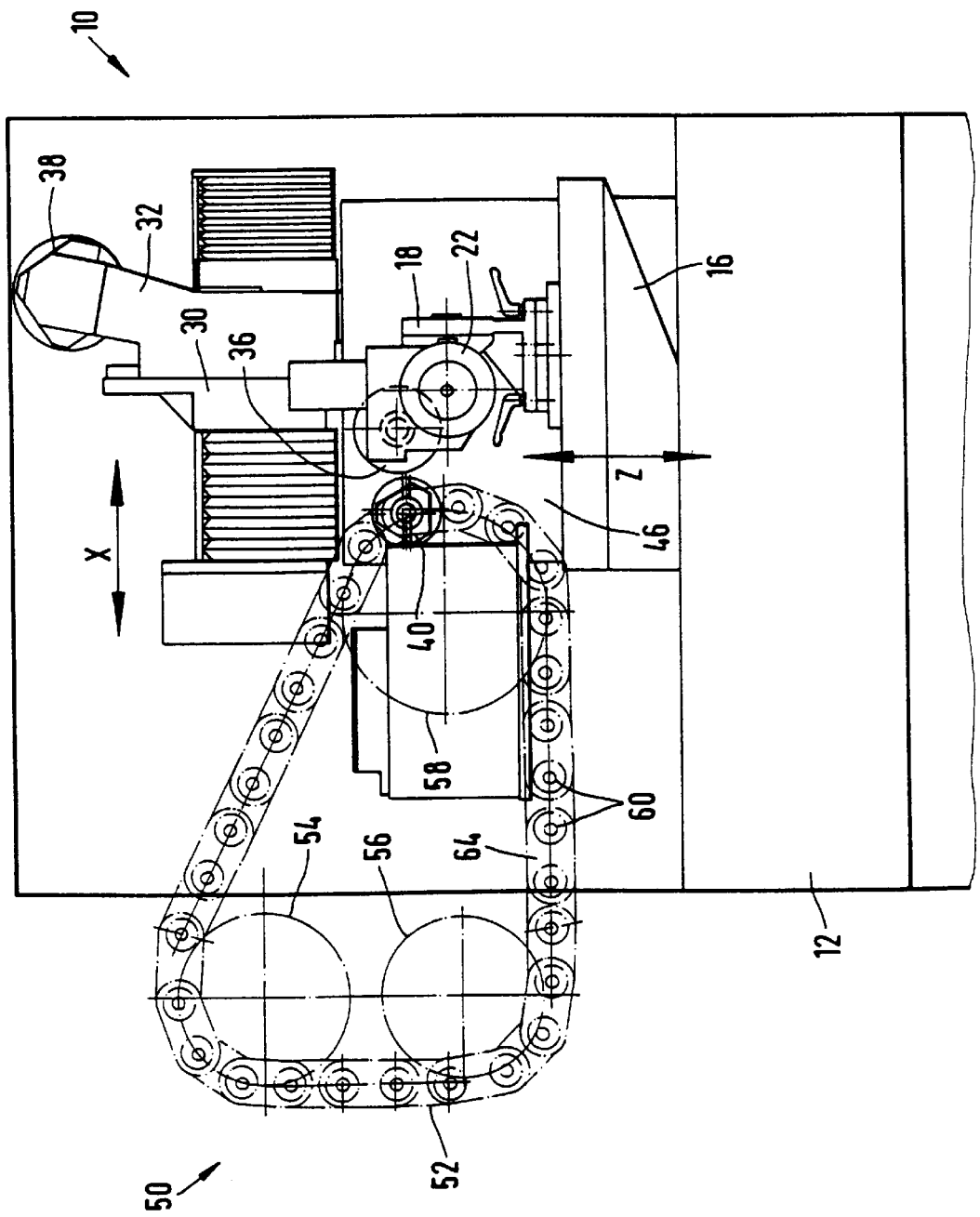
FIG. 2 is a front elevation as seen in the direction of arrow II in FIG. 1.
Figure 8:
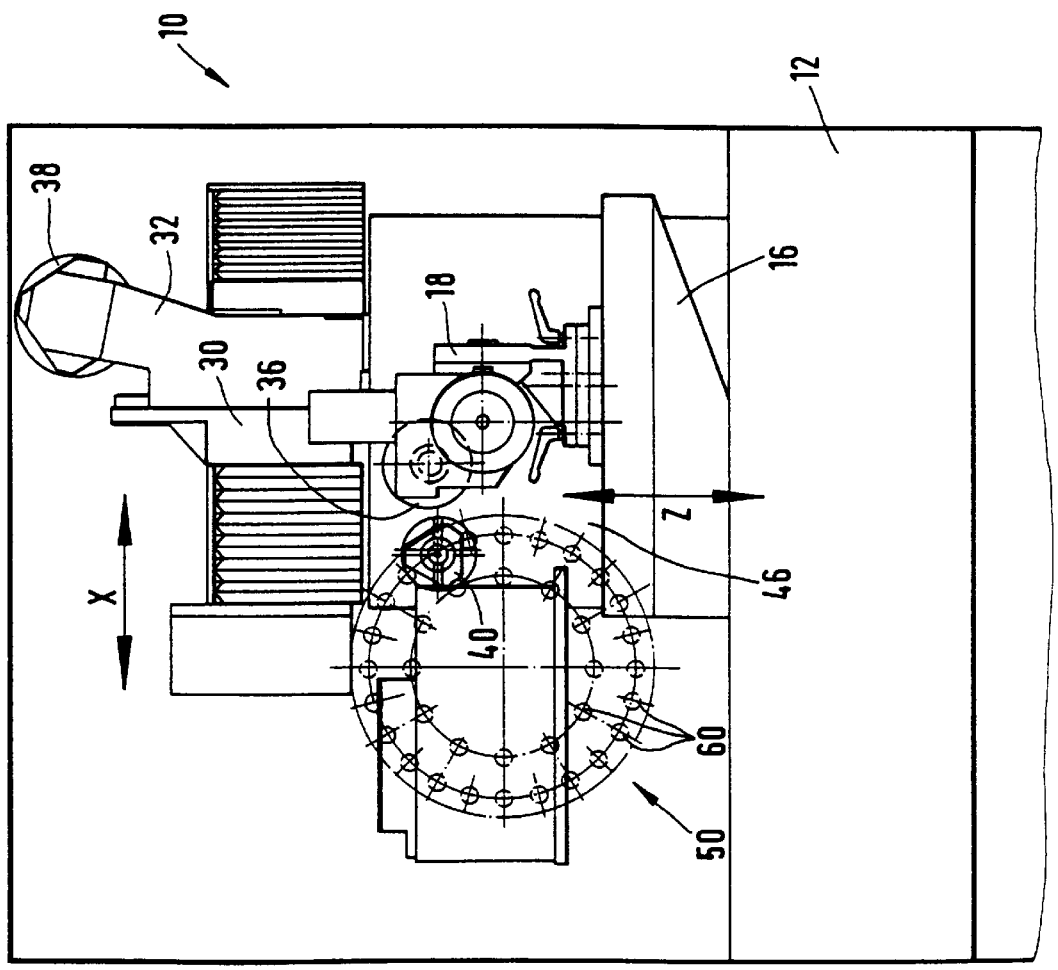
FIG. 8 shows an alternative to FIG. 2.

At a fixed spacing from the electrode disc 36, a gripper 40 comprising a plurality of fingers 42 is disposed on the X carriage 30. For the sake of simplicity, FIG. 1 and FIGS. 3 to 5 illustrate the gripper 40 as including two fingers. In many cases of application, however, it is advantageous for the gripper 40 to have three fingers 42, such as indicated in FIGS. 2 and 8 and shown in greater detail in FIGS. 9 to 11. The fingers 42 are arranged symmetrically with respect to a horizontal axis B extending in parallel with the Y axis. The fingers are movable hydraulically away from and towards the axis B so as to open and close the gripper 40. To increase realiability, the fingers 42 are biased in addition by spring pressure in the direction of axis B.

A handwheel 44 also may be seen in FIG. 1 by means of which the tool support 32 can be tilted so as to incline the electrode disc 36 in accordance with the machining to be carried out. The entire space which the electrode disc 36 and the gripper 40 can reach due to movements of the Y carriage 26 and the X carriage 30 will be referred to below as the work space 46.

A magazine 50 for storing workpieces W projects into the work space 46 in the area of the transfer position P and is coordinated with the erosion machine 10. As shown in FIGS. 1,2,3,4,5,6, and 7, the magazine 50 comprises a roller chain 52 which moves around guide sprocket wheels 54 and 56 and a drive wheel 58. In FIG. 8, the magazine 50 is shown to comprise a circular disc arrangement. In any case, the magazine 50 contains a plurality, for instance thirty, holds 60 for workpieces. In the case of the chain magazine the workpiece holds 60 each are retained in a joint 62 between two chain links 64 so as to be exchangeable. With the disc magazine, too, the workpiece holds 60 are exchangeable, each being retained in a paraxial bore. FIG. 8 shows two concentric, circular rows of such bores in an arrangement with which two bores each have their centers on a common radius of the disc. In any case, each workpiece hold 60 has an axis D parallel to the Y axis.

Each of the two magazines 50 illustrated is adapted to be driven stepwise so that one each of the workpiece holds 60 will adopt a position at which its axis D lies in the transfer position P. Each workpiece hold 60 is designed to receive one workpiece W and includes an adjustable stop 66, such as a screw threaded in from behind, in order to limit the depth of entry of the workpiece W.

Figure 6:
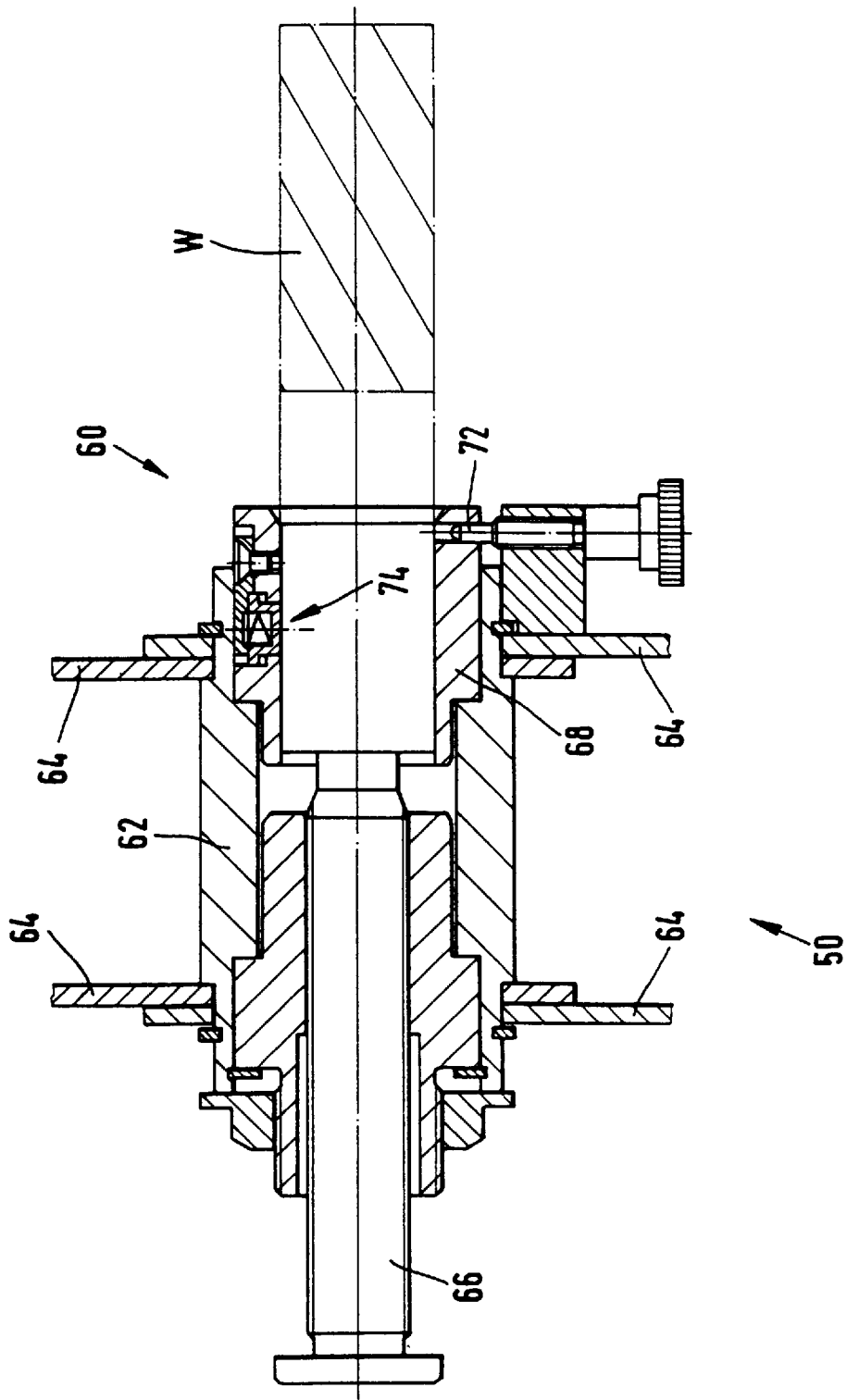
FIG. 6 is a sectional elevation along line VI—VI of FIG. 4, on still a larger scale.
Figure 7:
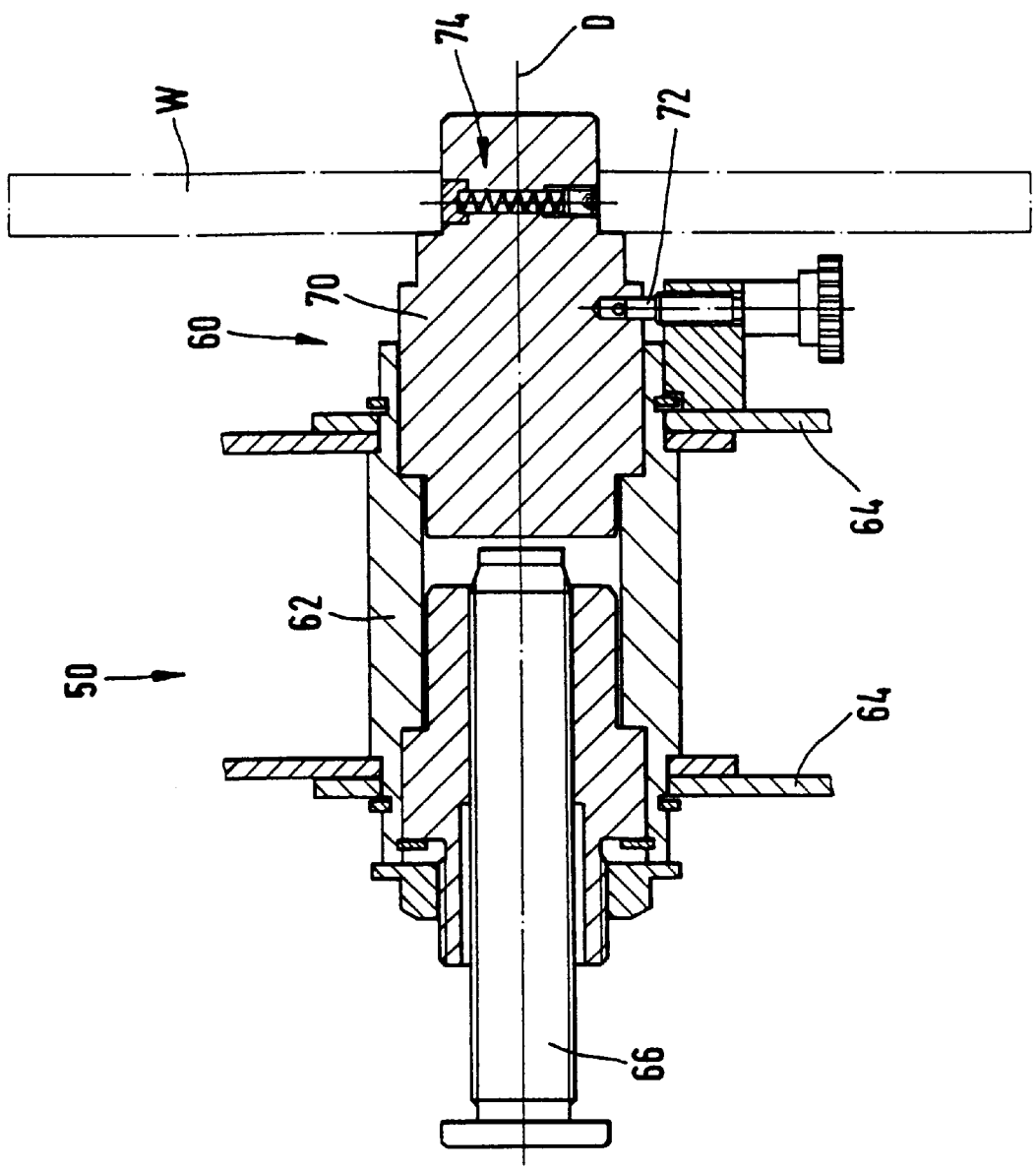
FIG. 7 shows an alternative to FIG. 6.

Regardless of whether the magazine 50 is of chain or disc type, the workpiece holds 60 may be matched with workpieces W of different type and size by exchangeable inserts which either may be a sleeve 68, as shown in FIG. 6, or a mandrel 70, as shown in FIG. 7. In both cases, the inserts are secured against rotation and falling out. The means to prevent that in the embodiments illustrated is a conventional locking pin 72 which is biased radially inwardly. According to FIG. 6, the shaft of a workpiece W, for instance, a milling cutter is inserted as far as the stop 66. According to FIG. 7, a workpiece W having a central aperture, for instance, a saw blade, is donned on the mandrel 70. In both cases the workpiece W is retained in friction lock engagement by a clamping device 74 which is biased radially inwardly (FIG. 6) or radially outwardly (FIG. 7).

Figure 9:
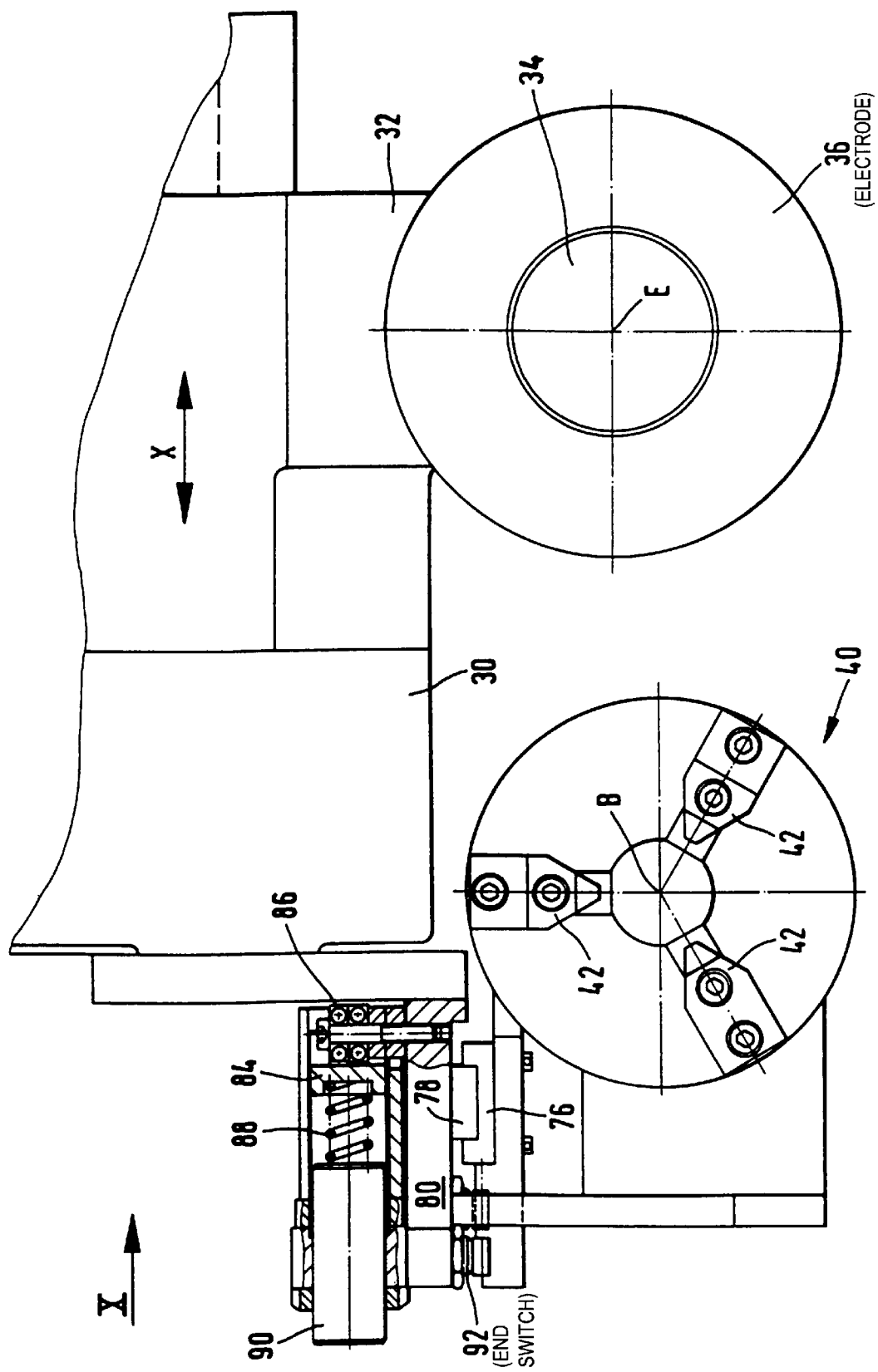
FIG. 9 shows an enlarged cutout of FIG. 2 or FIG. 8.
Figure 10:
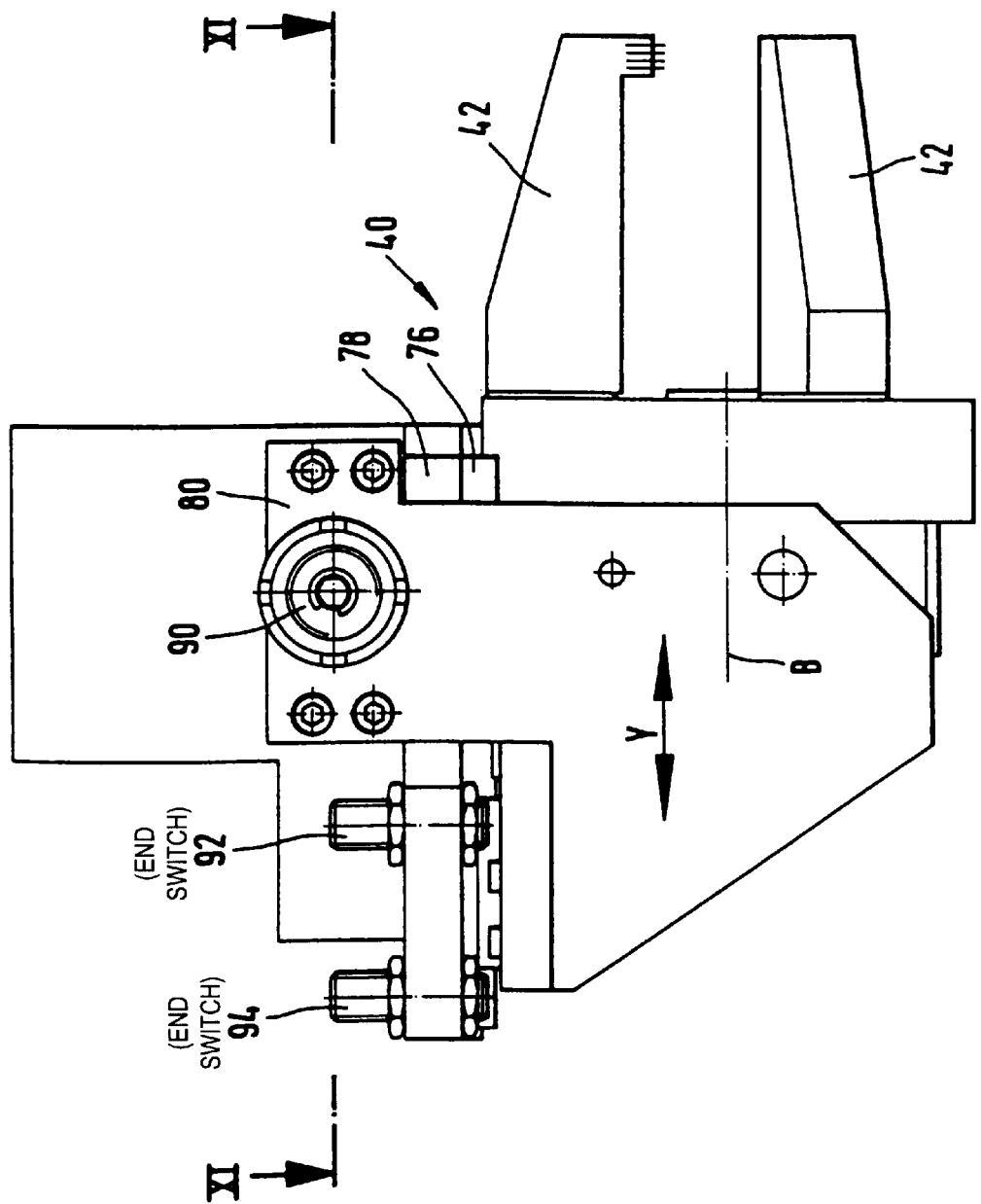
FIG. 10 is a side elevation as seen in the direction of arrow X in FIG. 9.
Figure 11:
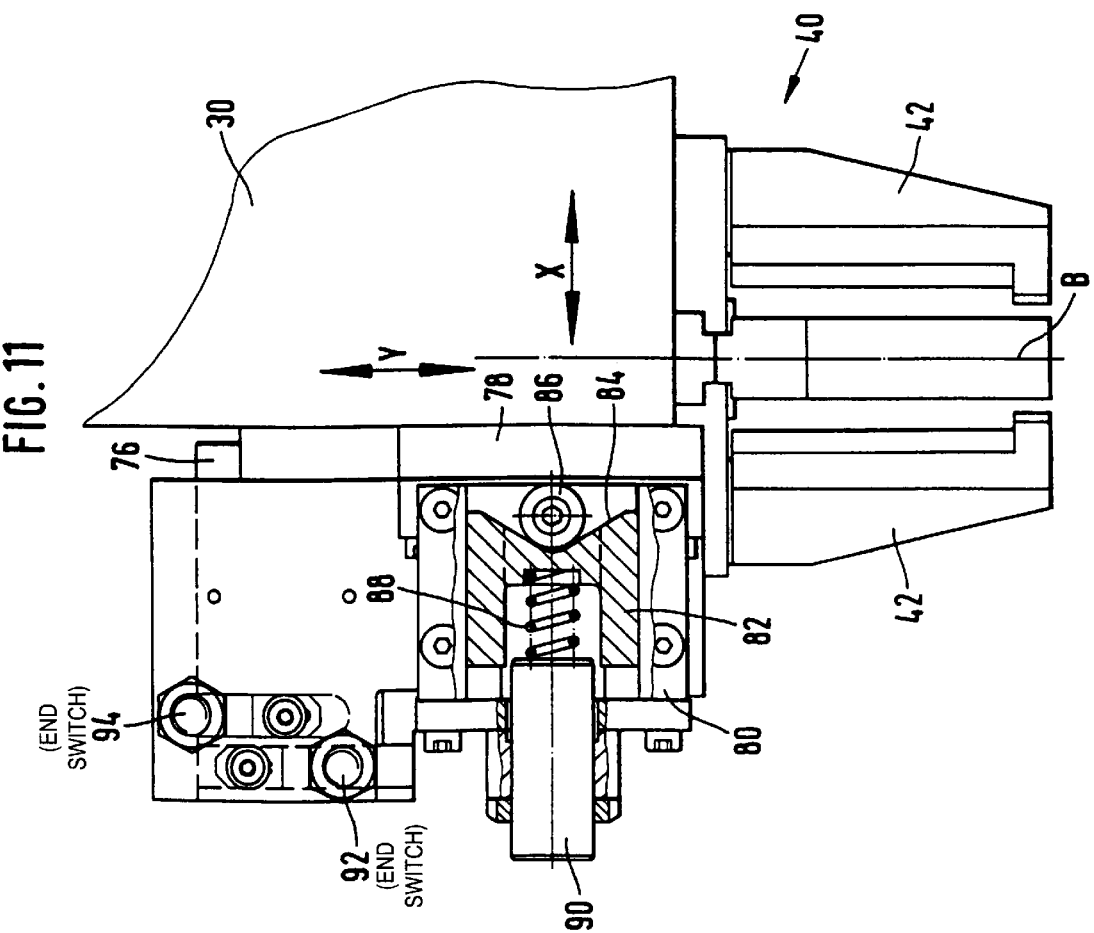
FIG. 11 is a top plan view corresponding to FIG. 10 and shown partly in section along line XI—XI.

FIGS. 9,10, and 11 show a preferred embodiment of the gripper 40 in greater detail. Here, the gripper 40 comprises three fingers 42, similar to a conventional chuck with three jaws. They are disposed at equal angular spacings of 120° around the gripper axis B. The gripper 40 may be shifted against elastic resistance from its normal position shown in the drawing in either direction along its axis B. To this end, the gripper 40 is mounted on a gripper carriage 76 which is movable on a longitudinal guide member 78 parallel to the axes B and Y. The longitudinal guide member 78 is formed with a transverse guide member 80 which is parallel to the X axis and along which a transverse carriage 82 is guided. The transverse carriage 82 comprises a cradle-like ramp arrangement 84 by which it rests on a roll 86 which in turn is supported on the gripper carriage 76 for rotation about an axis at right angles to the X-Y plane. The transverse carriage 82 is biased by a spring 88, embodied by a helical spring in the example shown, resting on an adjustable, threaded pin 90 which is screwed into the transverse guide member 80 in parallel with the X axis.

This arrangement tends to always maintain the gripper 40 in the normal position illustrated in which the roll 86 lies in the deepest hollow of the cradle-like ramp arrangement 84 of the transverse carriage 82, as may be seen in FIG. 11. Deflections of the gripper 40 in either direction along its axis B are monitored by end switches 92 and 94, respectively, which turn off at least the drive of the Y carriage 26 when a certain deflection is reached. This helps prevent damages which otherwise might occur when the gripper 40 meets with resistance due perhaps to faulty alignment or jamming, for instance, when inserting a workpiece W into the workpiece carrier 20 or when pulling out a workpiece from the magazine 50.

FIGS. 9 to 11 thus demonstrate that the gripper 40 preferably is not connected absolutely rigidly to the X carrige 30. It is likewise possible to exchange the fingers 42 or the gripper 40 as a whole for adaptation to workpieces W which are much bigger or smaller than the ones shown. And yet the fact remains that, with any particular equipment of the erosion machine 10 and the magazine 50, the gripper 40 is associated permanently with the X carriage 30 and ready for operation without any loss of time. On the other hand, the erosion machine 10 may take up work with an eroding tool, such as the electrode disc 36 illustrated, as soon as as the gripper 40 has transferred a workpiece W to be machined to the workpiece carrier 20 and the tool support 32 and the workpiece carrier 20 have been moved into operating position by being shifted with respect to each other by preferably simultaneous movements of the X carriage 30 and the Z carriage 16, respectively. These shifts may cover relatively small distances. The distance between the axis B of the gripper 40 and the axis marked E in FIG. 9 of the erosion spindle 34 is just great enough to make sure collisions do not occur.

Figure 3:
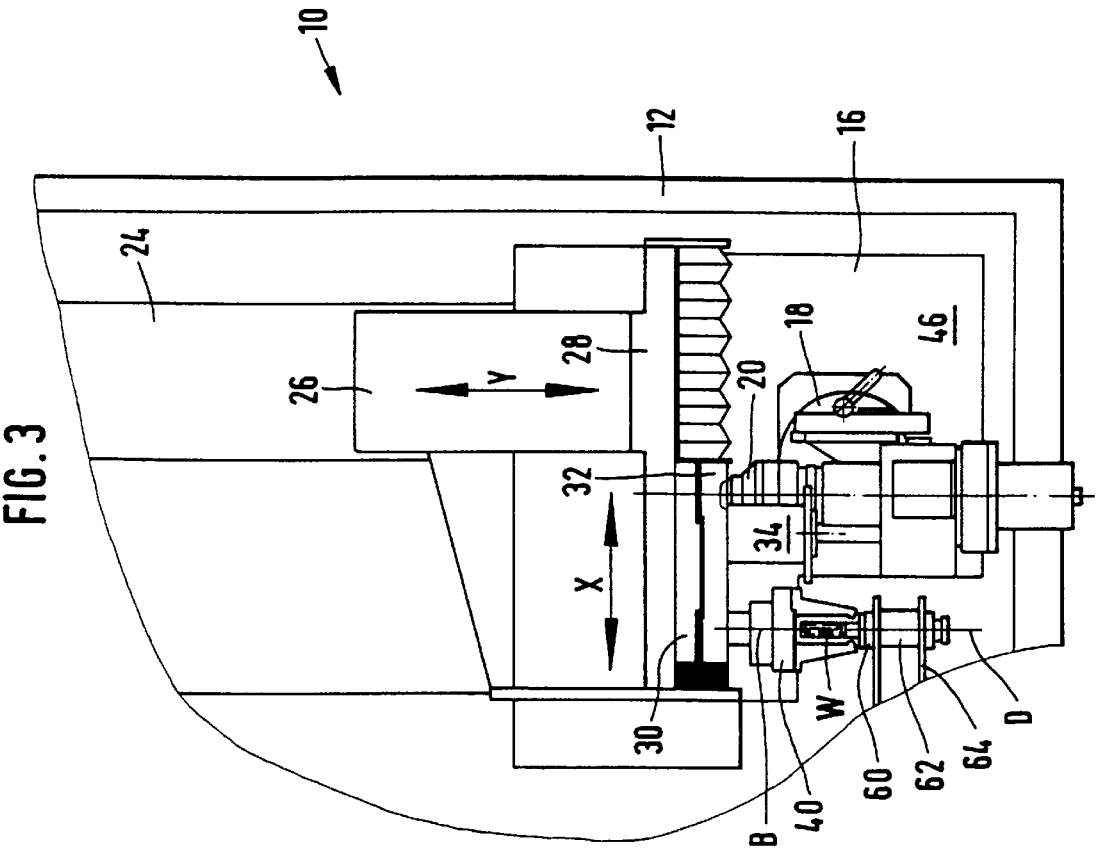
FIG. 3 is a top plan view of the right hand part of the means shown in FIG. 2, on a larger scale.
Figure 4:
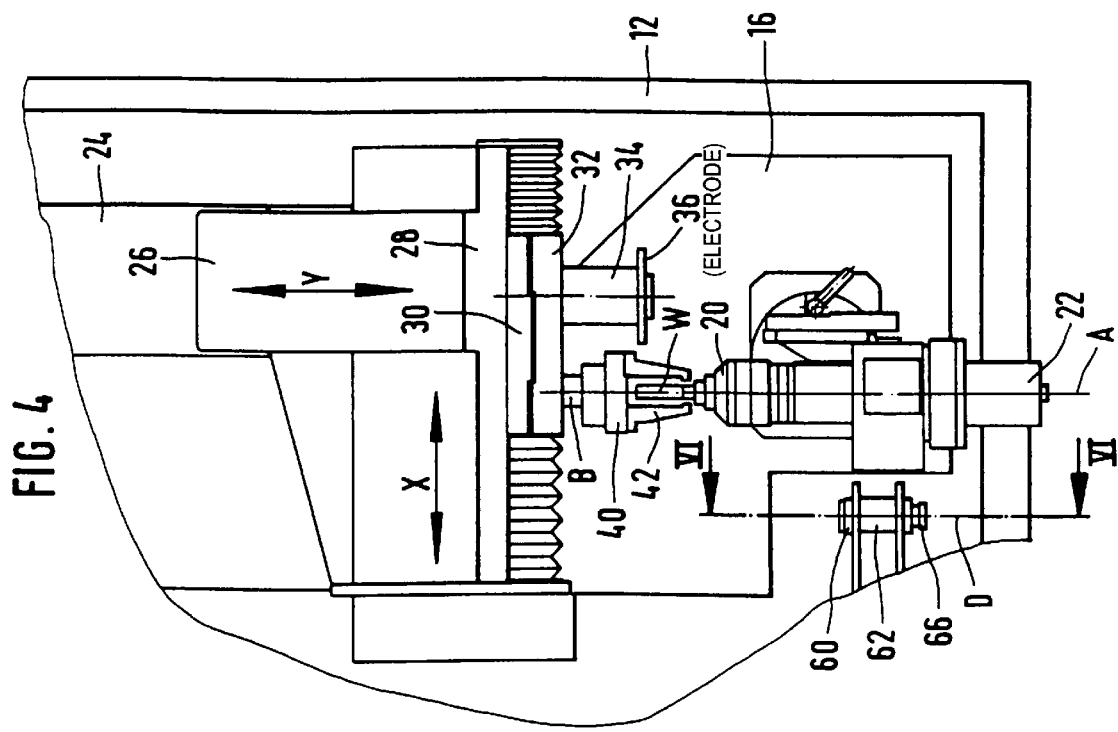
FIG. 4 is a top plan view similar to FIG. 3 but illustrating a different working position.
Figure 5:
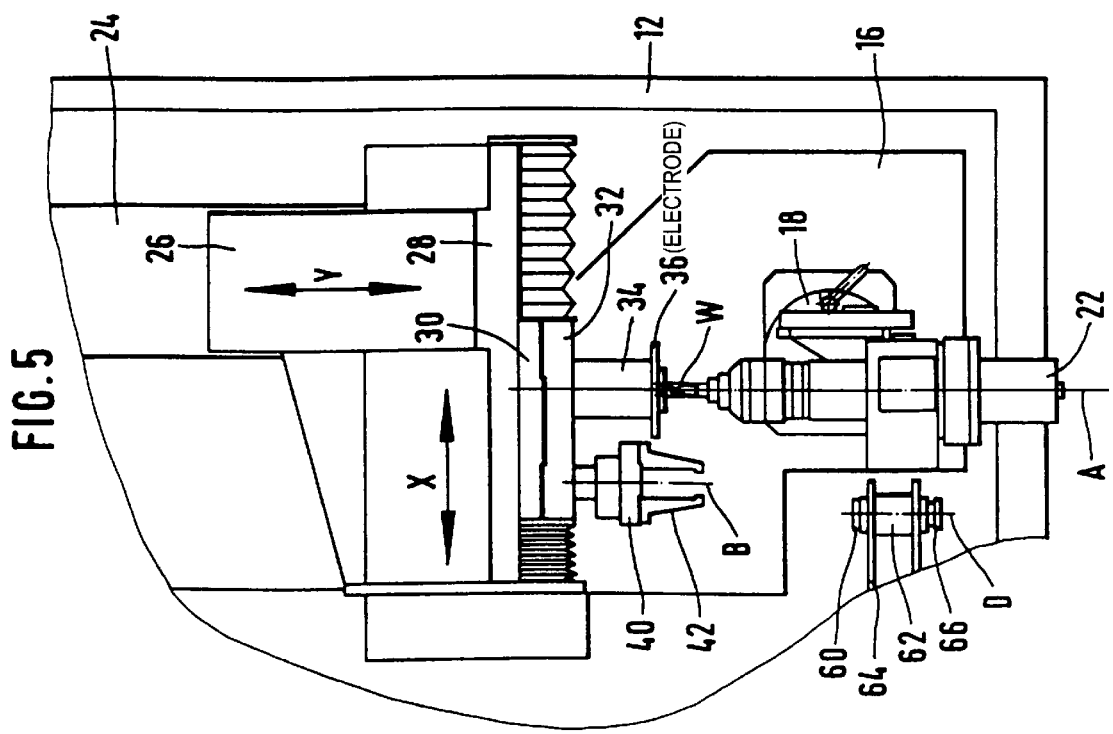
FIG. 5 is a top plan view showing yet another working position.

The apparatus thus described operates as follows:

According to FIGS. 1 to 3 the X carriage 30 is in a position in which the axis B of the gripper 40 lies in the transfer position P. Shifting of the Y carriage 26 will move the gripper 40 in open position to the workpiece W located in front of it in the magazine 50. This workpiece W is grasped by closing of the gripper 40 and pulled out of the corresponding workpiece hold 60 of the magazine 50 by retracting the Y carriage 26. Shifting the X carriage 30 and the Z carriage 16 then will cause the gripper 40 and the workpiece carrier 20 to become aligned with each other and, thereafter, renewed shifting of the Y carriage in forward direction will introduce the workpiece W into the workpiece carrier 20 where it will be clamped. This is followed by opening of the gripper 40 to release the workpiece W. Finally, the electrode disc 36 according to FIG. 5 is brought into its operative position in order to machine the workpiece W. When the machining is finished the workpiece W is returned to the workpiece hold 60 and the magazine 50 advanced by one step so that the next workpiece hold 60 containing a workpiece to be processed will reach the transfer position P.

We claim:

1. An apparatus for processing workpieces (W) by spark erosion, including an erosion machine (10) with a work space (46) in which a workpiece carrier (20) and a carriage (30) including a tool support (32) are movable in controlled fashion with respect to each other along at least three axes forming a three dimensional coordinate system (X, Y, Z), one of said axes being an axis of movement (Y) of the carriage (30) parallel to an axis (A) of the workpiece carrier (20), a magazine (50) comprising workpiece holds (60) which are movable into the work space (46) and at least one of which, located in a transfer position (P), is arranged with its axis parallel to said axis (Y) of the carriage (30) movement, and a gripper (40) for exchanging workpieces (W) between the magazine (50) and the workpiece carrier (20), characterized in that the gripper (40) is permanently arranged on the carriage (30), at a fixed spacing from the tool support (32) and the gripper is associated with an arrangement (84-90) that tends to keep it permanently in a normal position at the carriage (30) from which it can be deflected, against resilient resistance, only along its axis (B) parallel to the said axis of movement (Y) of the carriage (30).

2. The apparatus as claimed in claim 1, characterized in that the carriage (30) is movable along two axes (X, Y) and the workpiece carrier (20) is movable along the third axis (Z) of the three dimensional coordinate system (X, Y, Z).

3. The means as claimed in claim 2, characterized in that the gripper (40) cooperates with at least one end switch (92, 94) which stops the carriage (30) when a certain deflection of the gripper (40) has been reached.

4. The means as claimed in claim 1, characterized in that the gripper (40) cooperates with at least one end switch (92, 94) which stops the carriage (30) when a certain deflection of the gripper (40) has been reached.

5. The apparatus as claimed in claim 1, characterized in that the workpiece holds (60) of the magazine (50) are exchangeable.

6. The apparatus as claimed in claim 1, characterized in that the workpiece holds (60) of the magazine (50) comprise adjustable stops (66) to determine the axial position of the workpieces (W).

7. The apparatus as claimed in claim 1, characterized in that the workpiece holds (60) each comprise a sleeve (68) for insertion of a workpiece (W).

8. The apparatus as claimed in claim 1, characterized in that the workpiece holds (60) each comprise a mandrel (70) for donning of an apertured workpiece (W), especially a saw blade.

9. The apparatus as claimed in claim 1, characterized in that the workpiece holds (60) each comprise a clamping device (74) to secure the workpiece (W) taken up.

10. The apparatus as claimed in claim 1, characterized in that the gripper (40) comprises at least two fingers (42) which are movable hydraulically away from each other against spring pressure which is biasing them towards each other.

11. The apparatus as claimed in claim 1, characterized in that the magazine (50) is a chain or disc magazine.

* * * * *

UNITED STATES PATENT AND TRADEMARK OFFICE
CERTIFICATE OF CORRECTION

PATENT NO : 5,945,009
DATED : August 31, 1999
INVENTOR(S) : Ernst Beck; Norbert Bailer; Peter Lenard It is certified that error appears in the above-identified patent and that said Letters Patent is hereby corrected as shown below:

In column 5, line 34, please delete "means" and insert in lieu thereof --apparatus--.

In column 6, line 3, please delete "means" and insert in lieu thereof --apparatus--.

Signed and Sealed this

Sixth Day of February, 2001

Attest:

Q. TODD DICKINSON

*Attesting Officer*     *Director of Patents and Trademarks*